United States Patent
Olson (10) Patent No.: US 9,611,993 B2
(45) Date of Patent: Apr. 4, 2017

(54) WARNING LIGHT WITH TINTED LENS

(71) Applicant: Whelen Engineering Company, Inc., Chester, CT (US)

(72) Inventor: Andrew J. Olson, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 14/715,909

(22) Filed: May 19, 2015

(65) Prior Publication Data

US 2015/0330592 A1 Nov. 19, 2015

Related U.S. Application Data (60) Provisional application No. 62/000,106, filed on May 19, 2014.

(51) Int. Cl.

| | |
|---|---|
| *F21S 8/10* | (2006.01) |
| *G02B 5/20* | (2006.01) |
| *F21Y 103/10* | (2016.01) |
| *F21Y 115/10* | (2016.01) |

(52) U.S. Cl.
CPC .............. *F21S 8/10* (2013.01); *F21S 48/215* (2013.01); *F21S 48/2218* (2013.01); *G02B 5/20* (2013.01); *G02B 5/205* (2013.01); *F21S 48/321* (2013.01); *F21S 48/328* (2013.01); *F21Y 2103/10* (2016.08); *F21Y 2115/10* (2016.08)

(58) Field of Classification Search
CPC ........ F21S 48/215; F21S 48/2218; F21S 8/10; G02B 5/20; G02B 5/205
See application file for complete search history.

(56) References Cited

U.S. PATENT DOCUMENTS

| | | |
|---|---|---|
| 1,235,275 A | 7/1917 | Wood |
| 2,282,167 A | 5/1942 | Cullman |
| 3,774,023 A | 11/1973 | Cobarg et al. |
| (Continued) | | |

FOREIGN PATENT DOCUMENTS

WO 0214738 A1 2/2002

OTHER PUBLICATIONS

International Search Report and Written Opinion dated Aug. 13, 2015 (PCT/US2015/031502).

(Continued)

*Primary Examiner* — Thomas M Sember
(74) *Attorney, Agent, or Firm* — Alix, Yale & Ristas, LLP (57) ABSTRACT

A warning light includes a lens or cover is tinted with a grey or "smoke" tint that is not spectrally selective or alternatively referred to as "neutral density" in that it reduces transmission of all colors of light equally. The objective of the neutral tinted "smoked" lens is to reduce the conspicuity of warning lights when not in use. Ambient light penetration into the warning light is reduced by the proportion of tint and then light reflecting off the optical surfaces within the warning light are reduced again when passing through the tinted lens on the way out of the assembly. The resulting warning light appears dull and is less conspicuous than the same warning light or lightbar with a clear lens. The tinted lens or cover may include optical elements configured to re-direct light, and the entire lens or cover is molded from the same tinted plastic material.

6 Claims, 7 Drawing Sheets

(56) References Cited

U.S. PATENT DOCUMENTS

| | | |
|---|---|---|
| 5,103,381 A | 4/1992 | Uke |
| 5,921,672 A | 7/1999 | Dobler et al. |
| 5,951,150 A * | 9/1999 | Helstern ............... G09F 13/04 362/231 |
| 6,312,145 B1 | 11/2001 | Rhoad |
| 6,461,022 B1 | 10/2002 | Kreutzer et al. |
| 6,471,375 B2 | 10/2002 | Kobayashi et al. |
| 6,641,284 B2 | 11/2003 | Stopa et al. |
| 6,644,841 B2 | 11/2003 | Martineau |
| 6,739,738 B1 | 5/2004 | Smith |
| 6,758,582 B1 | 7/2004 | Hsiao et al. |
| 6,851,835 B2 | 2/2005 | Smith et al. |
| 6,986,593 B2 | 1/2006 | Rhoads et al. |
| 7,001,047 B2 | 2/2006 | Holder et al. |
| 7,008,079 B2 | 3/2006 | Smith |
| 7,070,310 B2 | 7/2006 | Pond et al. |
| 7,079,041 B2 | 7/2006 | Fredericks et al. |
| 7,083,304 B2 | 8/2006 | Rhoads et al. |
| 7,083,313 B2 | 8/2006 | Smith |
| 7,114,832 B2 | 10/2006 | Holder et al. |
| 7,118,261 B2 | 10/2006 | Fredericks et al. |
| 7,158,019 B2 | 1/2007 | Smith |
| 7,172,319 B2 | 2/2007 | Holder et al. |
| 7,175,303 B2 | 2/2007 | Kovacik et al. |
| 7,246,917 B2 | 7/2007 | Rhoads et al. |
| 7,427,167 B2 | 9/2008 | Holder et al. |
| 7,438,447 B2 | 10/2008 | Holder et al. |
| 7,461,944 B2 | 12/2008 | Alessio |
| 7,500,766 B1 | 3/2009 | Reynolds |
| 7,520,650 B2 | 4/2009 | Smith |
| 7,674,018 B2 | 3/2010 | Holder et al. |
| 7,690,826 B2 | 4/2010 | Kim |
| 7,712,931 B1 | 5/2010 | Smith |
| 7,850,334 B2 | 12/2010 | Holder et al. |
| 7,850,345 B2 | 12/2010 | Holder et al. |
| 7,959,322 B2 | 6/2011 | Smith |
| 7,993,036 B2 | 8/2011 | Holder et al. |
| 8,138,941 B2 | 3/2012 | Smith et al. |
| 8,246,212 B2 | 8/2012 | Schaefer et al. |
| 8,247,957 B2 | 8/2012 | Chen et al. |
| 2003/0031028 A1 | 2/2003 | Murray et al. |
| 2003/0185005 A1 | 10/2003 | Sommers et al. |
| 2005/0128748 A1 | 6/2005 | Suwa |
| 2007/0242461 A1 | 10/2007 | Reisenauer et al. |
| 2008/0165535 A1 | 7/2008 | Mazzochette |
| 2008/0205061 A1 | 8/2008 | Holder et al. |
| 2008/0259631 A1 | 10/2008 | Holder et al. |
| 2009/0016052 A1 | 1/2009 | Holder et al. |
| 2009/0021945 A1 | 1/2009 | Holder et al. |
| 2009/0043544 A1 | 2/2009 | Holder et al. |
| 2009/0168395 A1 | 7/2009 | Mrakovich et al. |
| 2010/0110677 A1 | 5/2010 | Stein |
| 2010/0128489 A1 | 5/2010 | Holder et al. |
| 2010/0134046 A1 | 6/2010 | Holder et al. |
| 2010/0172135 A1 | 7/2010 | Holder et al. |
| 2010/0238669 A1 | 9/2010 | Holder et al. |
| 2012/0049748 A1 | 3/2012 | Stuesse et al. |
| 2012/0327655 A1 | 12/2012 | Li |
| 2013/0051048 A1 | 2/2013 | Stein |
| 2013/0235580 A1 | 9/2013 | Smith |
| 2013/0242595 A1 | 9/2013 | Jaffe et al. |
| 2013/0279159 A1 | 10/2013 | Pickard et al. |
| 2013/0306998 A1 | 11/2013 | Ulasyuk |

OTHER PUBLICATIONS

"Standard Plastic Lenses for Semiconductors," Ledil Oy, Tehdaskatu 13, 24100 SALO, Finland, Examples of Products, 14 pages (Aug. 3, 2005).
"OEM Module Guide," Dialight Lumidrives Ltd., 7 pages (2006).
"L2Optics Flare Lens," L2Optics Ltd., sales brochure, 2 pages (2005).

* cited by examiner

WARNING LIGHT WITH TINTED LENS

BACKGROUND

The present disclosure relates generally to vehicular warning light systems adapted primarily for installation on emergency response and service vehicles. More particularly, the present invention relates to warning light assemblies in the form of individual lights and lightbar assemblies mounted on emergency vehicles, such as police, fire, ambulance and other vehicles.

Conventional emergency vehicle lightbars employed for warning light applications on emergency vehicles typically include a longitudinal support with light sources, electronic assemblies and various lenses and covers mounted to the substrate. The lenses and/or covers define a weather-resistant enclosure surrounding the light sources and the electronic assemblies. Prior to modern LED light sources, warning lights employed halogen or strobe light sources generating white light and used colored lenses to filter out undesired colors to generate colored light signals. This approach required the light source to generate far more light than was necessary for the desired emission pattern, because significant portions of the generated light were lost in passing through the colored lens. LED light sources generate light in each of the desired warning colors of red, blue, yellow and eliminate the need to use colored lenses. Most emergency warning light assemblies now employ clear lenses that allow a maximum proportion of the light generated by LED light sources to pass through the lens.

One result of the use of LED light sources and clear lenses is that the internal structures of the warning light assembly are clearly visible through the transparent lens. Some find the visible internal structures to be unsightly. The internal structures of a warning light typically include reflectors and optical lenses for shaping light emitted from the LED light sources. The optical components tend to catch light and generate reflections that are highly visible under most conditions, even when the warning lights are not in use. Many law enforcement vehicles are configured to be relatively inconspicuous and may be referred to as "unmarked" vehicles. For such applications it is desirable for any emergency warning light equipment to be inconspicuous, making it desirable to obscure the reflectors and optics contained in emergency warning lights mounted to unmarked law enforcement vehicles.

Because of the clear and/or transparent nature of lenses and/or covers, the internal components of emergency warning lights are commonly visible when the light emitters are inactive. There is a need for emergency warning lights that are inconspicuous until activated.

SUMMARY

A warning light includes a lens or cover that is tinted with a grey or "smoke" additive formulated to block a predetermined portion of light. The tint is not spectrally selective or alternatively referred to as "neutral density" in that it reduces transmission of all colors of light equally. The objective of the neutral tinted "smoked" lens is to reduce the conspicuity of warning lights when not in use. Ambient light penetration into the warning light is reduced by the proportion of tint and then light reflecting off the optical surfaces within the warning light are reduced again when passing through the tinted lens on the way out of the assembly. The resulting warning light appears dull and is less conspicuous than the same warning light or lightbar with a clear lens. Tinted lenses may also reduce solar heating of a warning light or lightbar enclosure. The tinted lens or cover may include optical elements configured to re-direct light, and the entire lens or cover is molded from the same tinted plastic material. When combined with one or more warning light sources, the tinted lens or cover reduces overall light output by a pre-determined ratio calculated to allow the relevant warning light to meet all relevant state or federal regulations pertaining to emergency warning lights.

DETAILED DESCRIPTION

Figure 1:
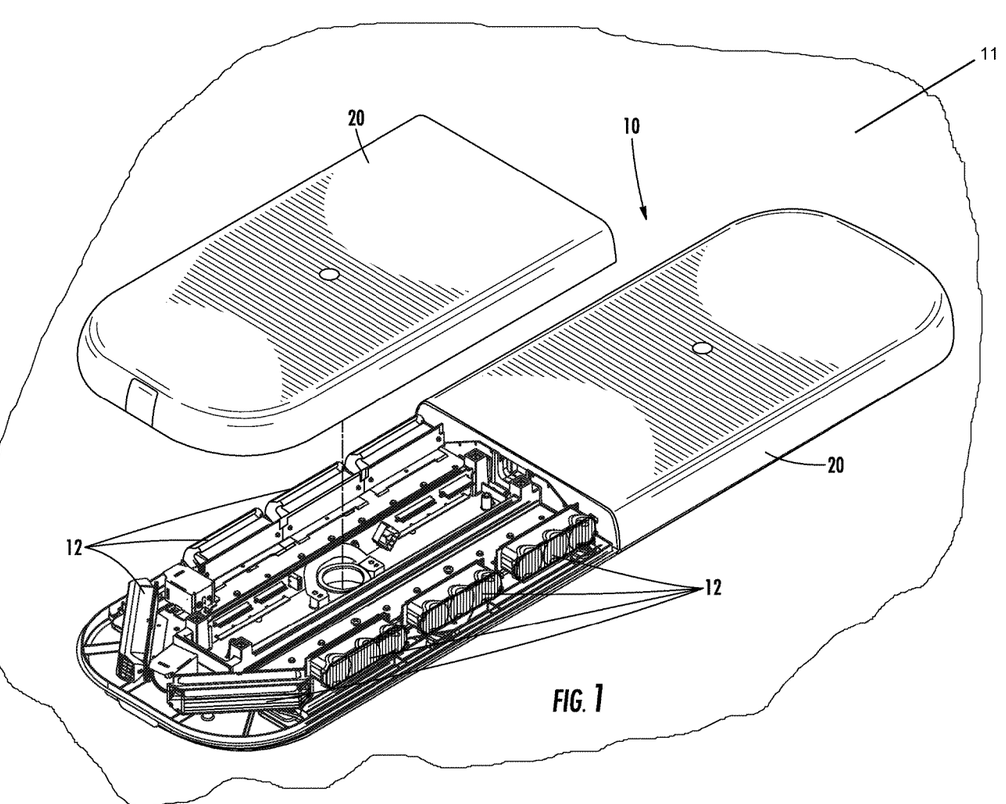
FIG. 1 is an exploded view of a representative lightbar assembly for which the present disclosure has application.

A lightbar assembly is illustrated in FIG. 1 and is one configuration of a warning light generally designated by the numeral 10. The illustrated lightbar 10 is one of many possible lightbar configurations, and the specific configuration of the lightbar is not part of the disclosed concept. The lightbar 10 includes a plurality of lightheads 12, each of which is configured to generate a light emission pattern having a predetermined color and intensity. Each of the lightheads may include metalized reflectors and/or optical elements arranged to re-direct light emitted from LED light sources. Generally speaking, lightbars such as that illustrated in FIG. 1 are intended to generate a warning light emission pattern visible 360° around a vehicle 11 to warn other motorists and pedestrians of an emergency situation. The location, the quantity of the light sources is arbitrary for purposes of the present disclosure.

Various state and federal regulations impose requirements for the light emission pattern(s) for emergency vehicles of different types. Federal standard KKK A 1822 governs light color and intensity standards for emergency lights on an ambulance, for example. California Code of Regulations Title 13 governs warning lights used on police cars. Other SAE standards, such as SAE J845 and J595 apply to warning beacons, lightbars, and surface mount warning lights. NFPA 1901 is a standard applicable to warning devices on fire and rescue vehicles. According to aspects of the present disclosure, neutral or grey tint is applied to the lens or cover of a warning light in a manner that permits the light to meet relevant standards. Stated alternatively, the tint is formulated and incorporated into the lens or cover to result in a lightbar or warning light that complies with regulations applicable to the intended use of the lightbar or warning light.

The illustrated warning lights operate in a manner well-known to those skilled in the art. Electric cabling delivers power and control signals to the devices, which may include on board circuitry for generating pre-determined warning light signal patterns, such as flash patterns. Lightbars and warning lights are distributed about the exterior of the vehicle to produce warning light signals visible from any vantage point around the vehicle and comply with the standard applicable to the vehicle type, e.g., police, fire, ambulance, etc. A lens or cover is typically situated to enclose and protect the light generating and other internal components of the warning light or lightbar. Light from the light generators must pass through the lens or cover when emitted from the warning light or lightbar. The term "lens" in the context of this application is used to refer to the last (in the direction of light emission) light transmissive layer through which light must pass to be emitted from the warning light or lightbar. A lens according to this specification may, but is not required to, include features that modify the direction of light passing through the lens. Such features may include optical ribs to spread light or collimators to focus light into a beam or general direction of emission. In the context of the disclosure, lens may be used interchangeably with the term "cover" in that the lens may function as a protective barrier against the ambient environment, serving to exclude water, dirt and other contaminants.

Figure 9:
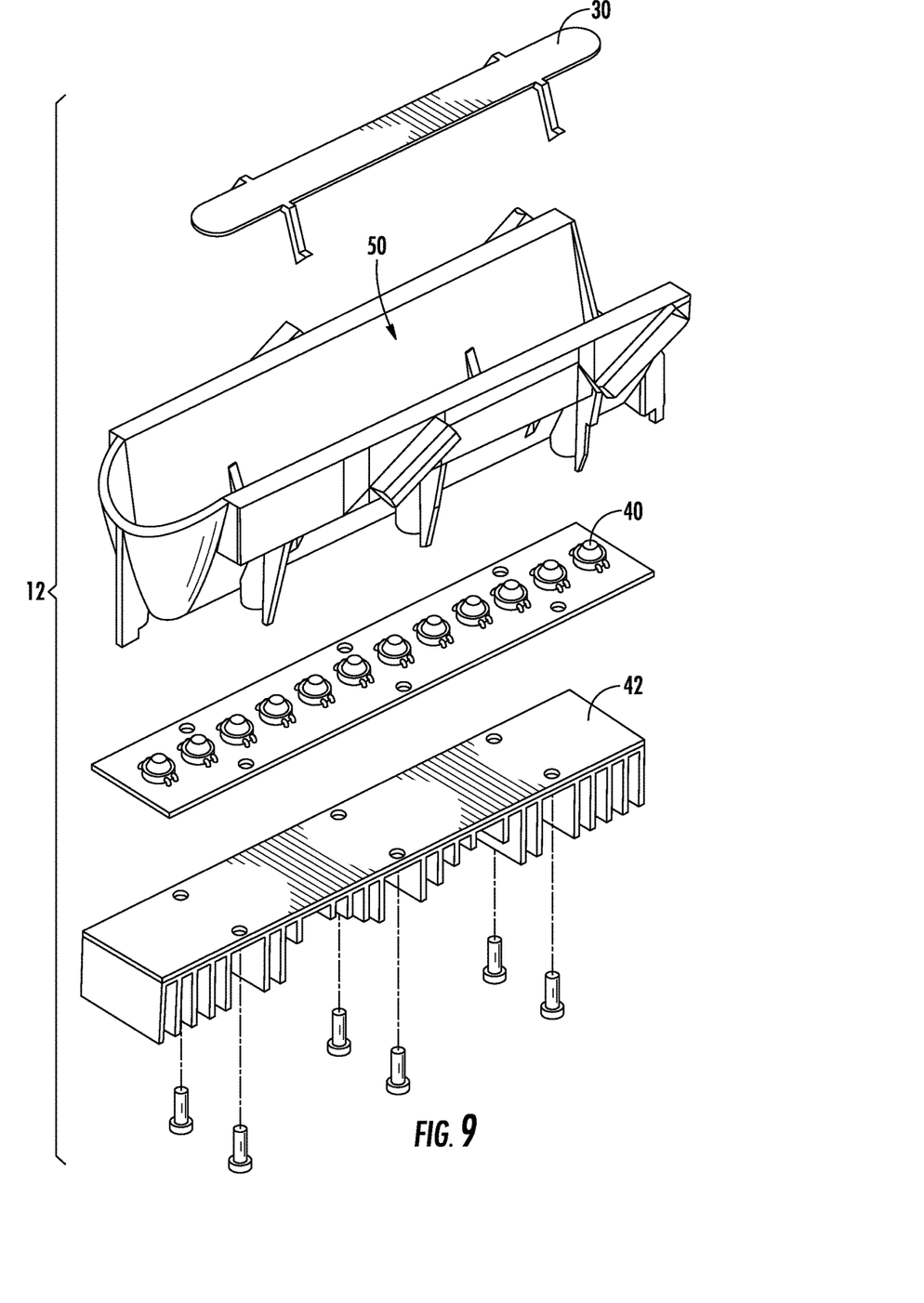
FIG. 9 is an exploded perspective view of a representative LED lighthead compatible with the disclosure.

FIG. 9 is an exploded view of a lighthead 12 configured to combine the light generated by several LED lamps 40 into a wide angle beam. The LED lamps 40 are selected to generate a specific color of light compatible with the intended us of the lighthead. Police lights tend to be blue and/or red, while ambulances and fire vehicles tend to use combinations of red and white light. Each lighthead 12 will typically include LED light sources 40 supported on a PC board or similar support, a heat sink, and an optical structure including one or more reflectors 50, and one or more optical lenses 30. Here, the term "optical lens" is used to differentiate the lenses that are part of the optical structure of the warning light from the lens/cover 20 that may or may not include features to modify the path of light passing through the lens/cover. The lens/cover is the outermost light transmissive layer through which light must pass before emission from the lightbar or warning light. The reflector may be an external metalized surface or an internal reflecting surface of an optical solid (not shown). The reflectors and lenses can catch ambient light and shine in a way that makes the warning lights undesirably conspicuous. Lightheads such as that illustrated in FIG. 9 may be arranged at various locations within a light bar enclosure such as that illustrated in FIG. 1 to generate a desired warning light signal pattern when activated. The lightheads and other internal components of the lightbar 10 are enclosed by a cover 20 such as that illustrated in FIG. 1.

Figure 2:
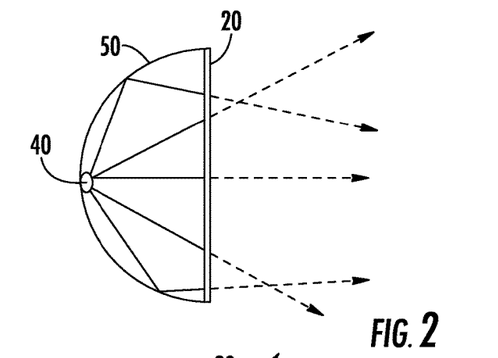
FIGS. 2 and 2A are each an enlarged sectional view of a representative warning light unit.
Figure 2A:
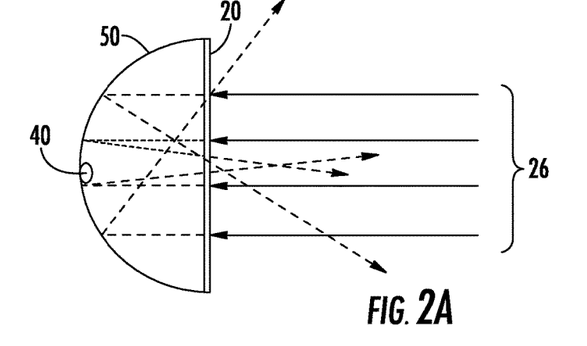

FIGS. 2 and 2A illustrate a simplified warning light structure including an LED light source 40, a reflector 50, and a tinted lens (cover) 20. FIG. 2 illustrates the situation when the warning light is activated. LED light source 40 emits light that is reflected or directly passes through tinted lens 20 to provide a warning light signal. The density or proportion of tint incorporated into lens 20 blocks at least approximately 15% of the light incident upon the lens 20. The tint is neutral or not spectrally specific, so the tinted lens blocks at least approximately 15% of the light incident upon it no matter what color the light is. More preferably, the tinted lens blocks approximately 18% of the light incident upon it. In other embodiments the tinted lens may be configured to block up to at least approximately 55% of the light incident upon it. The density of the tint is coordinated with the light output of the warning light to ensure that the warning light still meets relevant specifications when activated.

FIG. 2A illustrates a situation where the LED light source 40 is not activated, and the lighthead is in an environment where ambient light is present such as outdoors during daylight. Ambient light 26 passes through the lens 20, and in the process loses at least approximately 15% of its intensity. Once inside the lighthead, the ambient light 26 is reflected by the reflector 50 and is reflected back through the lens 20, again losing at least approximately 15% of its intensity. As shown in FIG. 2A, the tinted lens 20 effectively reduces the intensity of ambient light passing into and then out of the warning light by roughly double the intensity reduction imposed by the tinted lens 20, since the light must pass through the lens 20 twice before leaving the assembly.

Figure 3:
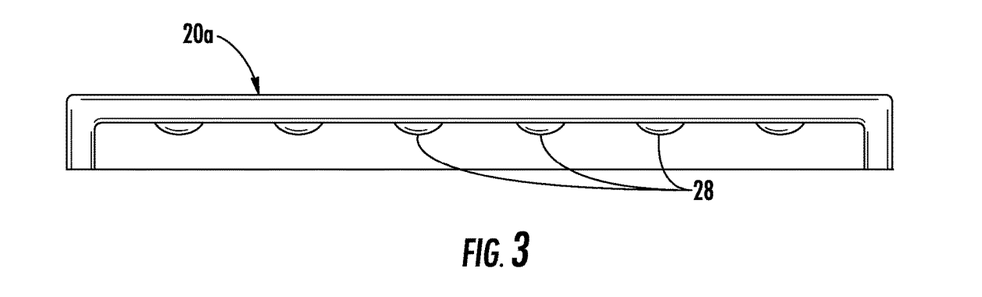
FIG. 3 is a representative warning light lens including optical features.

FIG. 3 illustrates a representative lens 20a with optical elements 28 molded into the surface facing the LED light sources (not shown). The illustrated optical elements 28 are circular collimating refractors to collimate divergent light emitted from an LED into a beam.

Figure 5:
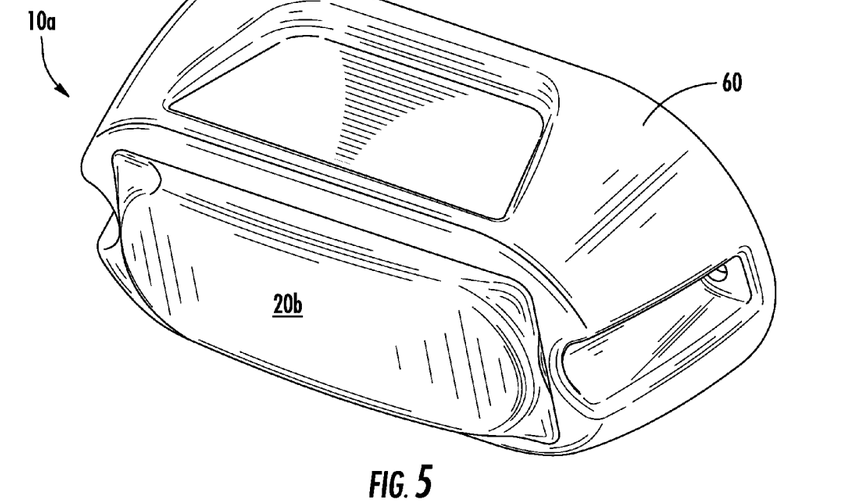
FIG. 5 is a perspective view of a representative warning light module including a bezel for mounting to a vehicle surface.
Figure 6:
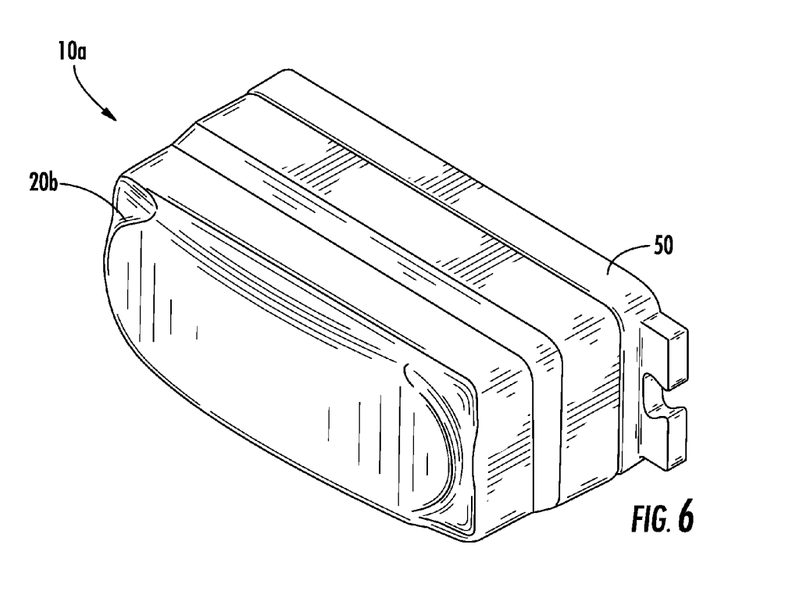
FIG. 6 is a perspective view of the warning light module of FIG. 5, without the bezel.

FIGS. 5 and 6 illustrate a self-contained lighthead 10a with a bezel 60 (shown in FIG. 5) and without the bezel in FIG. 6. A lens 20b surrounds the internal components of the lighthead and mates with a heat sink 50 to define a sealed enclosure. Lighthead 10a is compact and can be mounted to many different surfaces of a vehicle, including on a push bar, in the grill, on the forward surface of rear view mirrors, and on any vertical surface. Where aesthetics are a concern, the bezel 60 may be used to provide a more finished appearance. When mounted in a grill, the bezel may not be used. Small warning lights such as this are made more inconspicuous when the disclosed tinted lenses are used.

Figure 7:
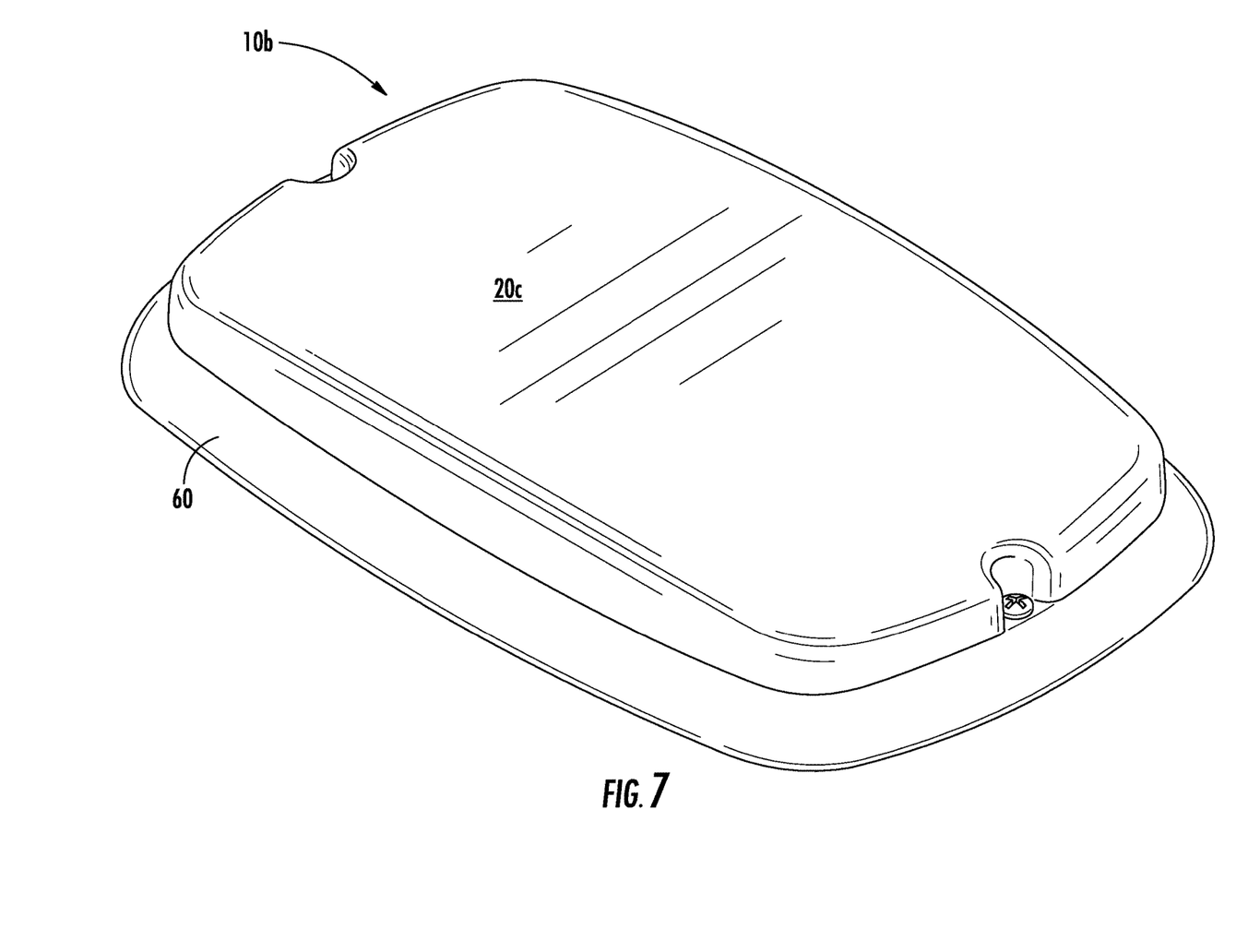
FIG. 7 is a perspective view of a warning light module configured for mounting to a vertical side surface of an emergency vehicle, such as a fire truck or ambulance.
Figure 8:
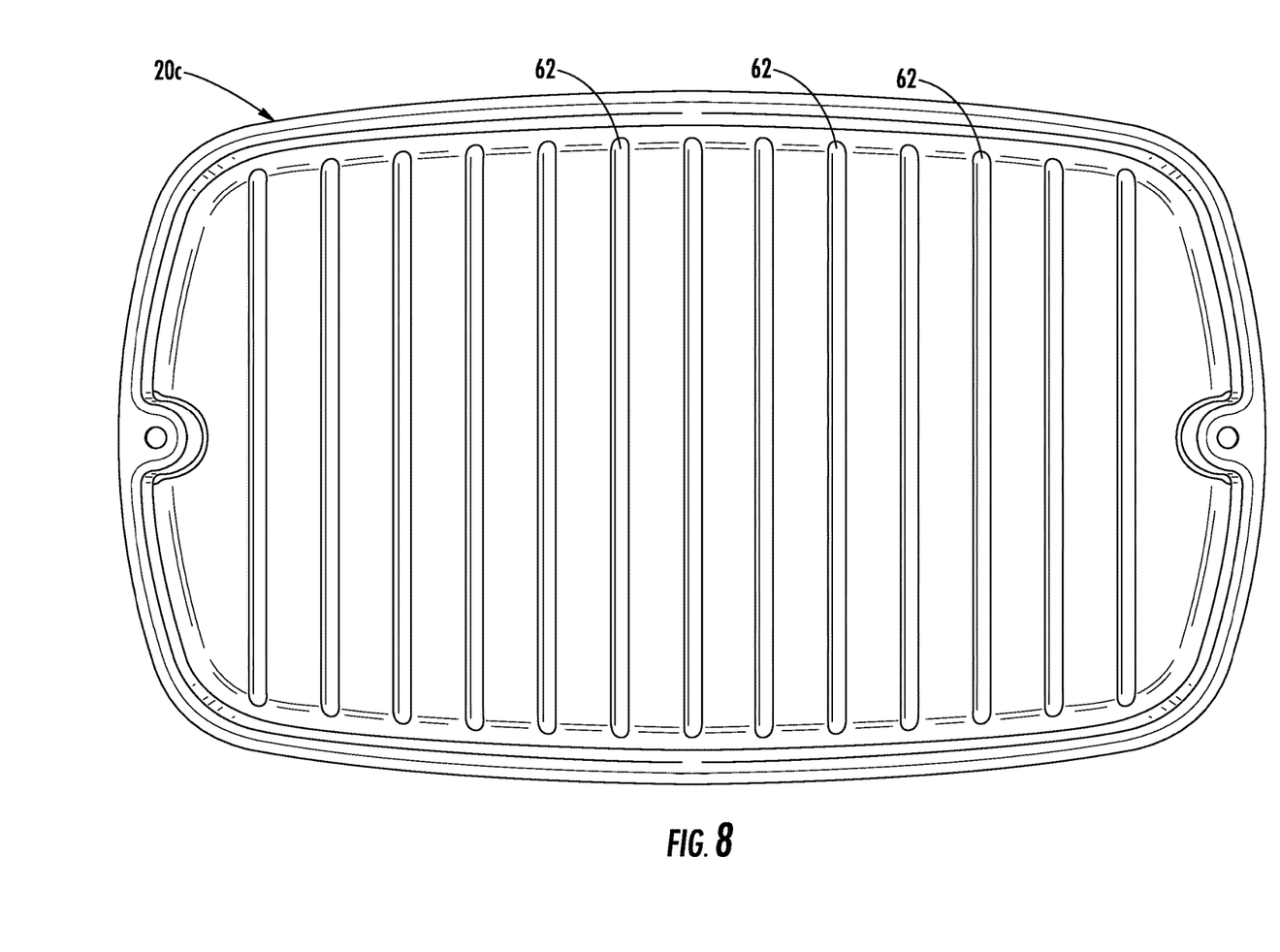
FIG. 8 is a rear view of the cover of the warning light module of FIG. 7, showing optical features molded into the rear surface of the cover.

FIGS. 7 and 8 illustrate a larger warning light 10b configured for mounting to the vertical surface of the body of a fire truck or ambulance. FIG. 8 is a rear view of the lens 20c, showing optical spreader bars 62 molded into the rear surface of the lens 20c. The lens 20c and the integral optical features are molded from the same tinted plastic, such as polycarbonate. When the LED lamps emitters are inactive, the tint of the lens sufficiently obscures the reverse transmission to the interior of the lens so that a quasi-opaque effect is produced wherein the internal portions of the lightbar are obscured or are nearly substantially invisible, as schematically shown in FIG. 2A.

Figure 4:
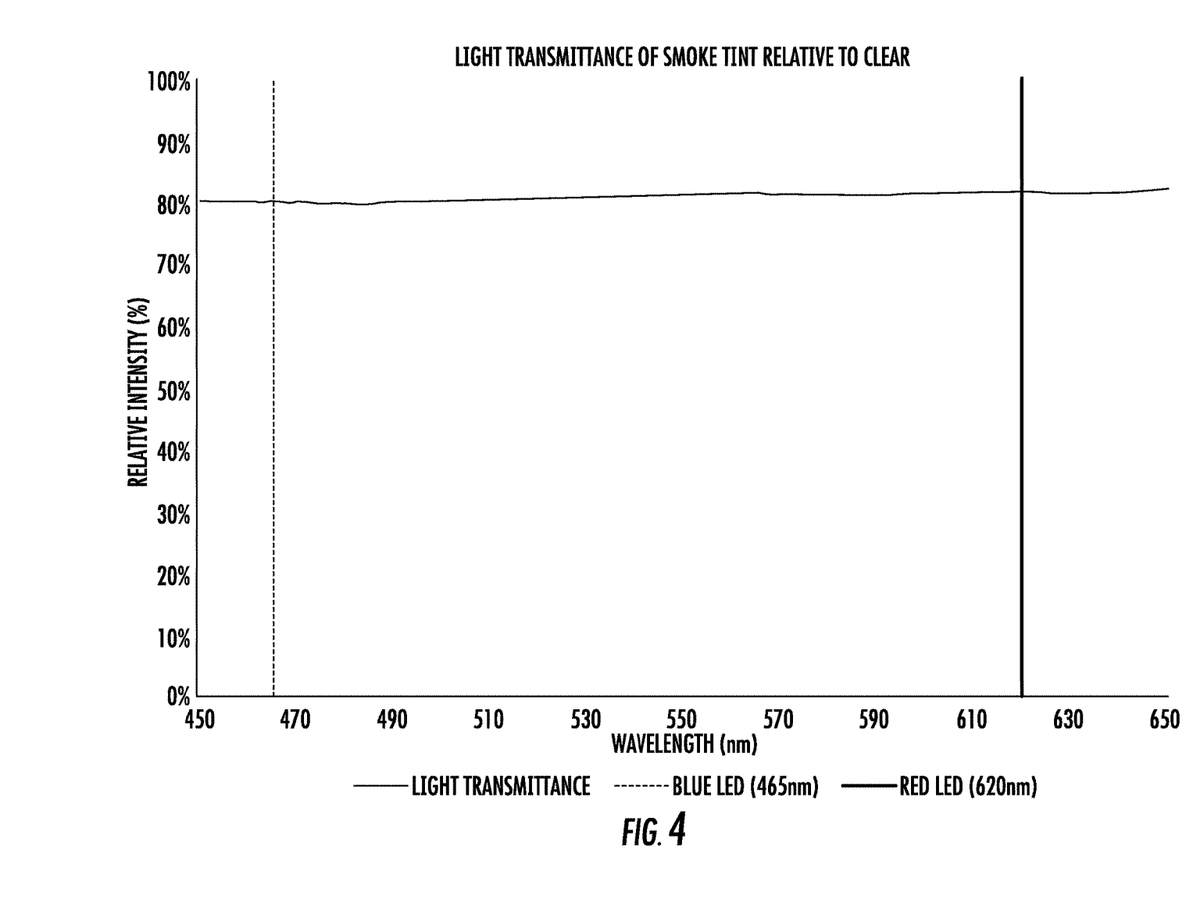
FIG. 4 is a graphical representation of the tint applied to a representative warning light lens, where the tint is formulated to block approximately 18% of light passing through the lens and allow the remaining 82% of light generated by a light source to pass through the lens.

In one embodiment, the material employed for the lens is a smoke tinted polycarbonate PC-93686 manufactured by Polymer Concentrates, Inc., 179 Woodlawn Street, Clinton, Mass. 01510. The ratio of smoke (grey) concentrate added to clear polycarbonate will vary depending upon the thickness of the lens being molded. One representative ratio is approximately one unit of smoke concentrate per 25 units of clear polycarbonate. FIG. 4 graphically presents a test performed on a tinted lens according to aspects of the disclosure. It can be seen that the smoke (grey) tint reduces light transmittance through the lens to the same degree regardless of the wavelength of the light. More specifically, red light is reduced by the same amount as blue light, even though they have distinct wavelengths. A color tinted lens, such as a blue lens would reduce red dramatically, while allowing blue light to pass. Colored lenses were commonly used in the prior art to generate colored light signals from white light sources.

A lens or cover tinted according to the disclosure may also be described as a neutral density filter, which is a material that reduces or modifies the intensity of all wavelengths or colors of light equally, giving no changes in hue of color rendition. It can be a colorless (clear) or grey (smoke). For an ND filter with optical density d the amount of optical power transmitted through the filter, which can be calculated from the logarithm of the ratio of the measurable intensity (I) after the filter to the incident intensity ($I_0$), shown as the following:

Fractional Transmittance $(I/I_0)=10^{-d}$, or $$d = -\log_{10} \frac{I}{I_0}$$

In the disclosed embodiments, certain light generators have greater excess brightness than others. Some lightbars generate as much as twice the brightness needed to meet standard SAE J845, which permits use of lenses or covers having a higher optical density. For some lightbars it may be possible to use lenses or covers having an optical density as high as 0.347, corresponding to approximately 45% transmittance. For many lightheads and for blue warning lights in particular, a much lower optical density must be used to ensure the warning lights comply with relevant standards such as SAE J595. For blue lightheads, it may be necessary to use lenses or covers having an optical density not exceeding 0.071, corresponding to 85% transmittance.

Use of a neutral density (not spectrally selective) lens or cover is important in maintaining the proper color of the resulting warning light signal, which is commonly specified in the relevant standards or regulations. Light generators that have been constructed to comply with chromaticity (color) requirements dictated by standards or regulations will remain compliant with respect to color when equipped with neutral density covers or lenses according to the present disclosure.

The invention claimed is:

1. An emergency warning light mountable to an emergency vehicle, said emergency warning light comprising:
   a plurality of LED lamps each emitting light having a predetermined wavelength;
   an optical structure arranged to re-direct at least a portion of light emitted from the plurality of LED lamps into a wide angle beam of light visible to an observer outside of the emergency vehicle; and
   a lens disposed in a position where light from the LED light sources must pass through said lens to produce said emission pattern, said lens having an optical density of at least 0.071 that reduces or modifies the intensity of all wavelengths or colors of light equally, resulting in no substantial change in color of light emitted from the warning light relative to light generated by said plurality of LED lamps.

2. The emergency warning light of claim 1, wherein the optical density of said lens is between approximately 0.071 and 0.347.

3. The emergency warning light of claim 1, wherein said lens is the last material through which light from said LED lamps will pass in said emission direction before being emitted from said emergency warning light.

4. The emergency warning light of claim 3, wherein said optical structure includes at least one optical lens arranged to modify the direction of light emitted from said plurality of LED lamps before said light is incident upon said lens.

5. The emergency warning light of claim 1, wherein said warning light is a light bar mounted to the exterior of the emergency vehicle including a substantially rigid substrate, a plurality of light emitting subassemblies and said lens comprises a plurality of lens portions arranged to surround and enclose said plurality of light emitting subassemblies.

6. The emergency warning light of claim 1, wherein said wide angle beam of light is visible 360° around the vehicle.

* * * * *